April 29, 1947. D. D. ORMSBY 2,419,913
CLUTCH
Filed Feb. 24, 1944
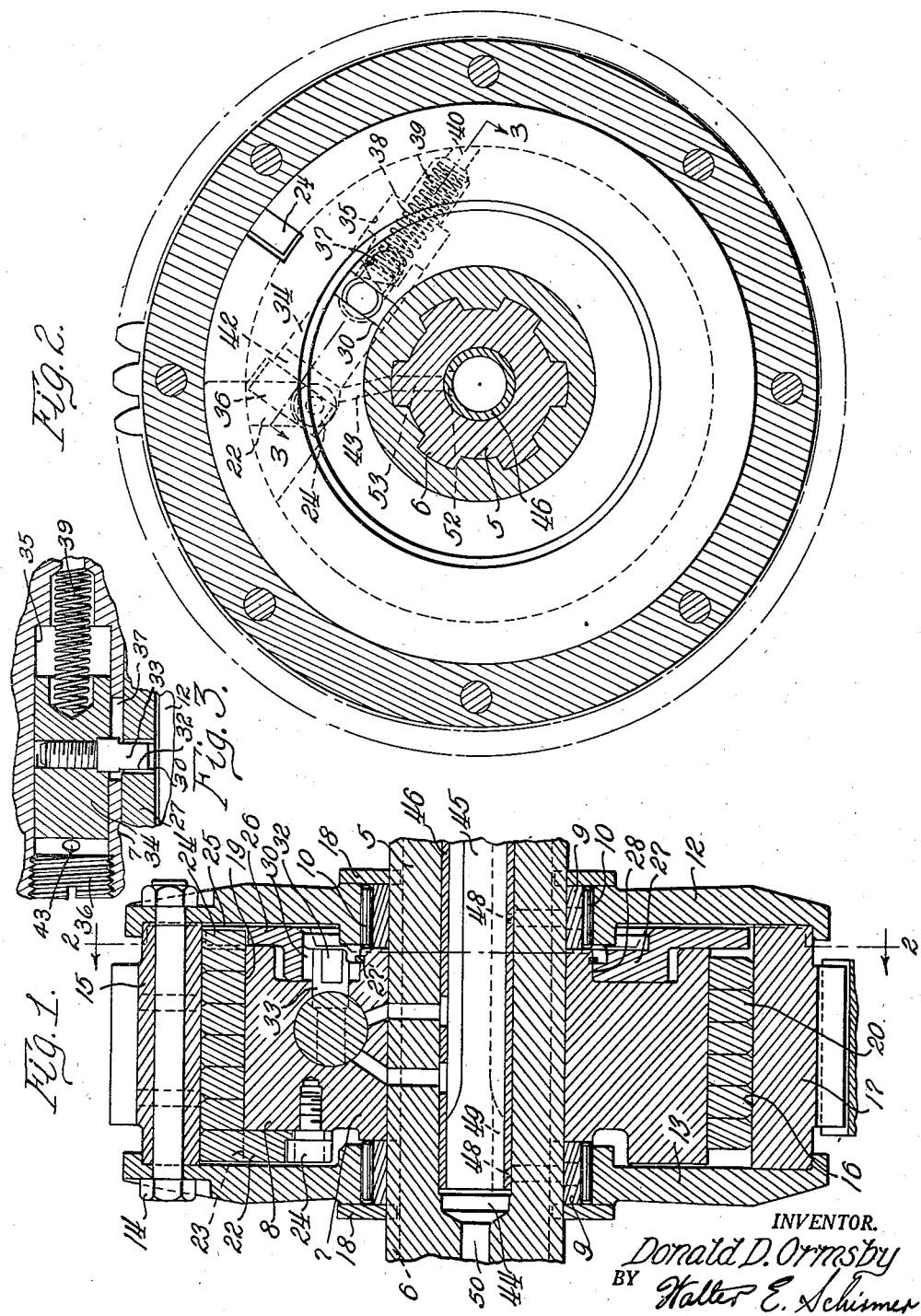
INVENTOR.
Donald D. Ormsby
BY Walter E. Schirmer
ATTY.

Patented Apr. 29, 1947

2,419,913

UNITED STATES PATENT OFFICE 2,419,913

CLUTCH

Donald D. Ormsby, Buchanan, Mich., assignor to Clark Equipment Company, Buchanan, Mich., a corporation of Michigan Application February 24, 1944, Serial No. 523,742

6 Claims. (Cl. 192—85)

1

This invention relates to clutch means, and more particularly is directed to a clutching mechanism for coupling a gear and hub element for conjoint rotation with a rotatable shaft.

The invention finds particular application in transmission constructions where it is desired to provide for coupling a freely rotating gear to a shaft under predetermined conditions without necessity of physically shifting a sliding clutch member or the like into and out of engagement.

In the copending application of Robert Lapsley, Serial No. 526,829, filed March 15, 1944, there is disclosed a combined fluid torque convertor and transmission arrangement utilizing a gear construction in which the gear element is journalled for rotation relative to the main shaft of the transmission and is adapted to be selectively clutched thereto by piston clutch members mounted within the hub portion of the gear. The present invention is considered an improvement upon and modification of such construction for accomplishing the same result, although it is to be understood that the principles hereof are equally applicable to numerous other applications where it is desired to couple a gear element to a shaft.

In a preferred form of the invention there is provided a hub member splined or otherwise keyed to a hub shaft which hub member is confined within a gear element journalled in any suitable manner for free rotation relative to the shaft. Between the hub member and the gear element there is provided a coil spring which, upon energization, acts to clutch the gear and hub together to provide conjoint rotation of the gear with the shaft. The present invention concerns itself particularly with the mounting of the spring clutch element on the hub member and the means for energizing the same.

One of the objects of the present invention is to provide a simplified construction wherein the energization of the spring can be accomplished automatically from a remote point.

A second object of the present invention is to provide a construction in which the clutching engagement is controlled by hydraulic pressure which may be in turn automatically controllable in response to predetermined load and speed conditions which may require the coupling or release of the gear relative to the shaft.

Another feature of the present invention is the provision of a construction which is simple in design, can be readily assembled in position and requires relatively few working parts.

Other objects and advantages of the present invention will appear more fully from the following detail description which, taken in conjunction with the accompanying drawings, will disclose to those skilled in the art the particular construction and operation of a preferred form of the present invention.

In the drawings:

Figure 1 is a sectional view through a construction embodying the present invention;

Figure 2 is a sectional view taken substantially on line 2—2 of Figure 1; and

Figure 3 is a detail sectional view taken on line 3—3 of Figure 2.

Referring now in detail to the drawings, there is disclosed in Figure 1 a shaft 5 having the splines or teeth members 6 formed thereon and adapted to receive the correspondingly splined portion 7 of a hub element 8. The hub element 8 is therefore mounted for conjoint rotation with the shaft.

Mounted at opposite sides of the element 8 on the shaft 5 and splined thereto are bushing or bearing members 9 adapted to receive a series of needle roller elements 10 journalling the two side plate members 12 and 13 thereon for free rotation relative to the shaft. The flanges or plate members 12 and 13 are provided with a series of circumferentially spaced studs 14 which are adapted to clamp the gear element 15 therebetween, thereby locking the annular gear element 15 rigidly to the flange members 13 and 12 for free rotation relative to the shaft. The gear element 15 is provided with a smooth internal cylindrical surface 16 and with externally projecting gear teeth 17. Suitable thrust washers 18 are keyed into the splines 6 of the shaft 5 for holding the needle rollers 10 against displacement, the inner ends of these rollers bearing against the hub 7 of the hub member 8.

Coiled about the external annular surface 19 of the hub member 8 is a helically coiled spring 20, which spring has its coils in side-by-side abutting relation and has one end thereof as indicated at 22 turned radially inwardly and passed through a slot 23 formed radially in the left-hand face of the hub element 8, thereby locking the end 22 of the spring against circumferential displacement. A suitable stud 24 is engaged through the slotted end of the radially extending portion 22 of the spring member for locking the spring against axial displacement relative to the hub element 8.

The opposite end of the spring 20 is provided with an outturned, axially directed portion 24 adapted to be received in a radial notch 25 formed in a plate member 26 which plate member has an axially offset inner portion 27 supported on the shoulder 28 of the hub element 8. The plate member 26 is held in position against axial displacement by means of the lock ring 27' and is provided on its inner periphery with a radially outwardly extending notch 30 adapted to receive the flatted end 32 of an axially extending pin member 33. The pin member 33 is rotatably journalled in a reciprocating piston element 34 mounted within the cylinder 35 formed at an angle in the hub element 8. The cylinder 35 is bored inwardly from the outer periphery of the hub element 8 and is closed at its outer end by means of the plug 36 threaded or otherwise secured therein. The piston 34 is provided with a recess 37 in its inner end which is adapted to receive one end of a coil spring member 38 seated in a counterbore 39 of the cylinder 35. The end of this counterbore is provided with a vent 40 for relieving back-pressure on the end of the piston 34.

The opposite end of the cylinder 35, as indicated at 42, is provided with an inlet port 43 drilled through the hub element 8 and leading inwardly toward the shaft 5. The shaft 5 itself is provided with an axial bore 44 adapted to receive a separator member 45 disposed longitudinally therein within an annular bushing or sleeve 46. The sleeve 46 is provided with radial ports 48 whereby lubricating oil can pass radially outwardly through the bushings 9 to the roller bearings 10. This lubricating oil is directed through the passageway 50 into the bore 44 of the shaft and thence through the passageway 49 into the ports 48.

As shown in Figure 2 the bushing 46 is also provided with a port 52 leading outwardly through the radial port 53 formed in the shaft to the passageway 43 leading to the end 42 of cylinder 35. When fluid under pressure is directed through the separator member 45 to the port 52 this fluid will be effective upon the headed end of piston 34 moving the piston in a clockwise direction as viewed in Figure 2 against pressure of spring 39. This movement of the piston results in clockwise rotation of the plate 26 by means of the pin 33 causing the end 24 of the spring 20 to be energized for expanding the spring. Immediately upon initial expansion of the spring coils, a clutching action will be produced between the coil springs and the internal annular surface of the gear element which provides an energizing action so that the successive coils of the spring are progressively engaged to build up a coupling force that will positively lock the gear element 15 to the hub element 8 to provide for conjoint rotation of the two members with the shaft 5. Upon release of pressure in the cylinder 35 the spring 39 will immediately return the plate member 26 in a counterclockwise direction, thereby releasing the energizing force on the end 24 of the spring, causing the spring to contract and releasing the coupling action between gear element 15 and the hub 8 to release the gear 15 to free rotation relative to the shaft.

The introduction of fluid under pressure into the passageway 52 may be controlled by a control valve mechanism responsive to speed and load conditions of a vehicle or other mechanism in which the gear is the functional part of the driving train so that the clutching action will be controlled automatically from a remote point in accordance with any predetermined conditions.

It is to be understood that various changes may be made in certain details of arrangement of elements as shown in the illustrated embodiment of the invention without, however, in any way departing from the underlying principles involved in the clutching action produced in accordance with my disclosure.

I therefore do not intend to be limited except as defined by the scope and spirit of the appended claims.

I claim:

1. In combination, a shaft having a hub member keyed thereon, a gear member encircling said hub member and journalled for rotation relative to said shaft, coiled spring means interposed between said members, and means in said hub member comprising a plate at one side of and circumferentially shiftable relative to said hub member, means on said plate for engaging an end of said spring means, piston means in said hub member responsive to fluid pressure, and means connected with said piston means and engaging said plate for shifting said plate to thereby energize said spring means and clutch said members together.

2. In combination, a rotatable shaft having a hub member splined thereon, said hub member having an external cylindrical surface, a spring coiled on said surface and having one end anchored to said hub member, a radial plate shiftable circumferentially relative to said hub member for energizing the opposite end of said spring to expand said spring, a piston carried within said hub member and having an axial projection engaging said plate, fluid pressure means for actuating said piston, and a gear having an internal surface closely encircling said spring and having means journalling it for rotation on said shaft, said gear having side wall portions radially enclosing said hub member and plate.

3. In combination, a shaft having a splined portion and an axial bore with a radial port in said splined portion, a hub secured on said splined portion and having an alined port, a gear encircling said hub and journalled for rotation on said shaft, coiled spring clutch means between said gear and hub having one end secured to said hub, a radial plate having means engaging the opposite end of said spring clutch means, and piston means carried by said hub and responsive to fluid pressure through said ports for rotating said plate relative to said hub member to energize said clutch means to couple said gear and shaft for conjoint rotation.

4. The combination of claim 1 further characterized in the provision of means for deenergizing said clutch means immediately upon release of said fluid pressure.

5. In combination, a shaft, a hub member fixed thereon having a smooth annular peripheral surface, a piston disposed within said hub member and having an axial projection, a coiled spring clutch extending about said surface and having one end anchored to said hub member, means engaging the opposite end of said clutch and operatively connected to said piston projection, means for introducing fluid under pressure through said shaft and hub member to actuate said piston, and a gear rotatably mounted on said shaft encircling said hub and adapted to be clutched thereto upon actuation of said piston.

6. In combination, a shaft having a hub member fixed thereon provided with a smooth annular peripheral surface, a coiled spring clutch about said surface having one end fastened to said hub member, a disc mounted on one side face of said hub member and circumferentially shiftable relative to said hub member, means in the outer periphery of said disc engaging the other end of said clutch, piston means disposed within said hub member and having means engaging said disc for shifting the same, means for introducing fluid under pressure into said hub member for actuating said piston, and gear means rotatable on said shaft and enclosing said hub member and having an internal annular surface closely overlying said clutch and engageable thereby upon actuation of said piston means.

DONALD D. ORMSBY.

REFERENCES CITED

The following references are of record in the file of this patent:

UNITED STATES PATENTS

| Number | Name | Date |
| --- | --- | --- |
| 663,396 | Stone | Dec. 4, 1900 |
| 779,806 | Schmucker | Jan. 10, 1905 |
| 844,273 | Fetters | Feb. 12, 1907 |
| 1,266,550 | Carroll | May 21, 1918 |
| 1,917,484 | Banker | July 11, 1933 |
| 1,159,717 | Scott | Nov. 9, 1915 |